US012517947B2

(12) United States Patent
Dong et al.

(10) Patent No.: US 12,517,947 B2
(45) Date of Patent: Jan. 6, 2026

(54) TEXT-BASED SEARCH OPTIMIZATION VIA IMPLICIT IMAGE SEARCH AUGMENTATION

(71) Applicant: eBay Inc., San Jose, CA (US)

(72) Inventors: Fei Dong, Shanghai (CN); Wei Liu, Shanghai (CN); Bin Li, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/139,514

(22) Filed: Apr. 26, 2023

(65) Prior Publication Data

US 2024/0362267 A1 Oct. 31, 2024

(51) Int. Cl.
| | |
|---|---|
| G06F 16/58 | (2019.01) |
| G06F 16/532 | (2019.01) |
| G06F 16/538 | (2019.01) |
| G06V 10/74 | (2022.01) |
| G06V 10/82 | (2022.01) |

(52) U.S. Cl.
CPC ........ *G06F 16/5866* (2019.01); *G06F 16/532* (2019.01); *G06F 16/538* (2019.01); *G06V 10/761* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 11,941,678 | B1 * | 3/2024 | Sadr | G06Q 30/0627 |
| 2009/0292685 | A1 * | 11/2009 | Liu | G06F 16/73 |
| | | | | 707/999.005 |
| 2023/0409653 | A1 * | 12/2023 | Basu | G06F 16/583 |
| 2024/0020336 | A1 * | 1/2024 | Li | G06F 16/7844 |

OTHER PUBLICATIONS

Alammar, "The Illustrated Stable Diffusion", Nov. 2022 (Year: 2022).*
Extended European Search Report received for European Application No. 24172541.5, mailed on Aug. 19, 2024, 9 pages.
Gunther et al., "Hype and hybrids: Search is more than Keywords and Vectors", Jina.ai Tech Blog, Nov. 4, 2022, pp. 1-21.
Office Action received for European Application No. 24172541.5, mailed on May 19, 2025, 9 pages.

* cited by examiner

*Primary Examiner* — Dawaune A Conyers
(74) *Attorney, Agent, or Firm* — Shook Hardy & Bacon L.L.P.

(57) ABSTRACT

A text-based search optimization via implicit image search augmentation eliminates or reduces the need for providing an image query input, performing multiple search queries, displaying multiple user interfaces, and the like by enabling a search engine to return a single set of search results comprising an aggregated and ranked set of text-based results and a set of image-based results based on one or more text-based keywords of a search query. Initially, a search query comprising one or more text-based keywords is received at a search engine. A machine learning model is utilized to generate an image based on a first portion of the one or more text-based keywords. Image-based results are generated based on the image. Text-based results are generated based on a second portion of the one or more text-based keywords. The image-based results and the text-based results are aggregated and ranked in a single set of search results.

14 Claims, 9 Drawing Sheets

(4 of 9 Drawing Sheet(s) Filed in Color)

TEXT-BASED SEARCH OPTIMIZATION VIA IMPLICIT IMAGE SEARCH AUGMENTATION

BACKGROUND

Many search systems allow users to submit search queries consisting of a few words or word phrases. The search systems return a list of relevant items related to the search queries. However, search queries tend to be ambiguous as users are often attempting to translate a visualization of an item or product into the words or word phrases. For example, suppose a user of one of these search systems is out in public and sees another person wearing unique sneakers. The user may attempt to search for similar sneakers. To do so, the user attempts to translate what the user recalls of the sneakers into a few words or word phrases and submits the search query.

Alternatively, the user may submit a photograph of the sneakers and do an image search. However, the user may not have an opportunity to take a photograph of the sneakers and the user must rely on an ambiguous text-based search. Even if the user is able to take a photograph of the sneakers, not all search systems support an image search and again the user must rely on an ambiguous text-based search.

SUMMARY

At a high level, aspects described herein relate to providing text-based search optimization via implicit image search augmentation, thereby eliminating or reducing the need for providing an image query input, performing multiple search queries, displaying multiple user interfaces, and the like by enabling a search engine to return a single set of search results comprising an aggregated and ranked set of text-based results and a set of image-based results based on one or more text-based keywords of a search query. In accordance with aspects of the technology described herein, a search query comprising one or more text-based keywords is received at a search engine. A machine learning model is utilized to generate an image based on a first portion of the one or more text-based keywords. Image-based results are generated based on the image. Text-based results are generated based on a second portion of the one or more text-based keywords. The image-based results and the text-based results are aggregated and ranked in a single set of search results.

The Summary is intended to introduce a selection of concepts in a simplified form that is further described in the Detailed Description of this disclosure. The Summary is not intended to identify key or essential features of the claimed subject matter, nor is it intended to be used as an aid in determining the scope of the claimed subject matter. Additional objects, advantages, and novel features of the technology will be provided, and in part will become apparent to those skilled in the art upon examination of the disclosure or learned through practice of the technology.

BRIEF DESCRIPTION OF THE DRAWINGS

The patent or application fie contains at least one drawing executed in color. Copies of this patent or patent application publication with color drawing(s) will be provided by the Office upon request and payment of the necessary fee. The present technology is described in detail below with reference to the attached drawing figures, wherein.

DETAILED DESCRIPTION

Figure 1:
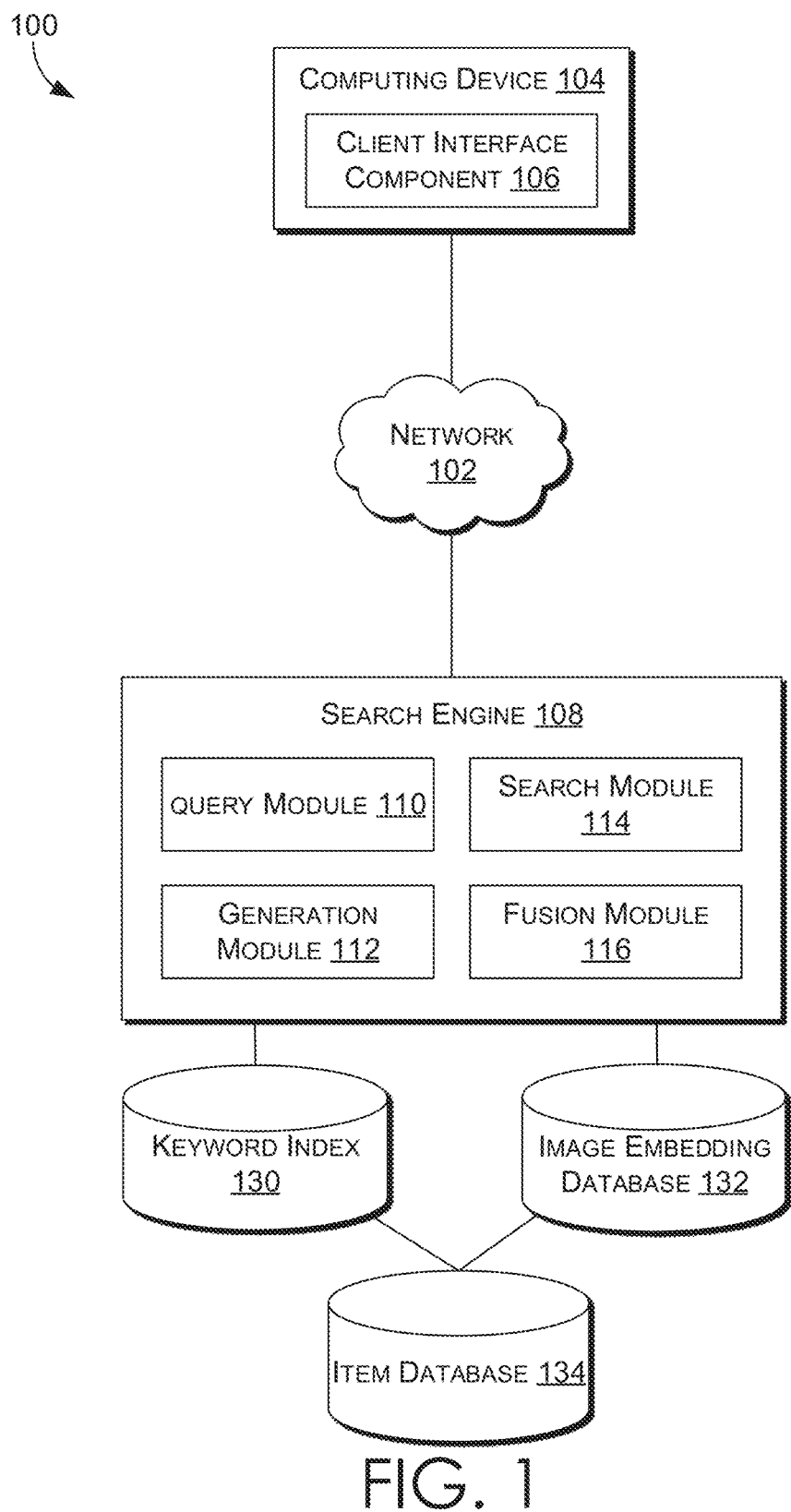
FIG. 1 is a block diagram of an example operating environment suitable for implementing aspects of the technology.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

While search engines are an incredibly useful tool for providing search results for received search queries, shortcomings in existing search technologies often result in the consumption of an unnecessary quantity of computing resources (e.g., I/O costs, network packet generation costs, throughput, memory consumption, etc.). When performing searches, users are often seeking particular search results. For instance, in the context of product search, a user may be seeking a particular item that has a particular style, design, or color. Existing search technologies often comingle search results or provide search results that are too vast and broad, which then requires the user to submit additional search queries or multiple filters to obtain the desired search results pertaining to the particular item.

For example, a search engine may receive a text-based query of "red nike sneaker" and subsequently provide a set of search results comprising shoes that include some combination of the terms "red," "nike," and "sneaker." The user may browse multiple pages of the search results and select multiple filters to access the particular "red nike sneaker" the user desires. This process of browsing, and filter selection unnecessarily consumes various computing resources of the search system, such as processing power, network bandwidth, throughput, memory consumption, etc. In some instances, the multiple pages of the search results provided by the existing search engine may even completely fail to satisfy the user's goal, thus requiring the user to spend even more time and computing resources on the search process by repeating the process of issuing additional queries and selecting more filters until the user finally accesses the desired content items. In some cases, the user may even give up searching because the search engine was not able to return desired search results after multiple searches.

These shortcomings of existing search technologies adversely affect computer network communications. For example, each time a query is received, contents or payload of the search queries is typically supplemented with header information or other metadata, which is multiplied by all the additional queries needed to obtain the particular item the user desires. As such, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if multiple users repetitively issue queries, it is expensive because processing queries consumes a lot of computing resources. For example, for some search engines, a query execution plan may need to be calculated each time a query is issued, which requires a search system to find the least expensive query execution plan to fully execute the query. This decreases throughput and increases network latency, and can waste valuable time.

Aspects of the technology described herein improve the functioning of the computer itself in light of these shortcomings in existing search technologies by providing a solution that enables a search engine to provide enhanced search accuracy with multi-modality (i.e., text and image) search queries utilizing only text input from the user. The image query is implicitly generated from the text query utilizing a machine learning model. The text and the generated image provide two modalities to be used in item retrieval by the search engine. As can be appreciated, better results are achieved compared to traditional search engines that only utilize one modality for item retrieval or require multiple inputs (i.e., text and image) from the user.

Aspects of the technology described herein provide a number of improvements over existing search technologies. For instance, computing resource consumption is improved relative to existing technologies. In particular, the search accuracy is enhanced with multi-modality (i.e., text and image) search queries, thereby allowing the user to more quickly access relevant search results. This eliminates (or at least reduces) the repetitive user queries and filter selections or separate text and image queries because the search results comprise search results that more closely correspond to what the user is seeking. Accordingly, aspects of the technology described herein decrease computing resource consumption, such as processing power and network bandwidth. For instance, a user query (e.g., an HTTP request), would only need to traverse a computer network once (or fewer times relative to existing technologies).

In like manner, aspects of the technology described herein improve storage device or disk I/O and query execution functionality. As described above, the inadequate search results provided by existing search technologies results in repetitive user queries and filter selections. This causes multiple traversals to disk I/O. In contrast, aspects described herein reduce storage device I/O because the user provides a reduced amount of inputs so the computing system does not have to reach out to the storage device as often to perform a read or write operation. For example, by providing a single text-based search query, the search engine can respond with enhanced multi-modal search results. Accordingly, there is not as much wear due to query execution functionality.

Having briefly described an overview of aspects of the technology described herein, an exemplary operating environment in which aspects of the technology described herein may be implemented is described below.

Turning now to FIG. 1, a block diagram is provided showing an operating environment 100 in which aspects of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a network 102; a computing device 104 having a client interface component 106; search engine 108 having a query module 110, a generation module 112, a search module 114, and a fusion module 116; keyword index 130; image embedding database 132; and item database 134. It should be understood that environment 100 shown in FIG. 1 is an example of one suitable operating environment. Each of the components shown in FIG. 1 may be implemented via any type of computing device, such as computing device 1000, described below in connection to FIG. 10, for example.

These components may communicate with each other via the network 102, which may include, without limitation, one or more local area networks (LANs) and/or wide area networks (WANs). In exemplary implementations, the network 102 comprises the Internet and/or a cellular network, amongst any of a variety of possible public and/or private networks. In aspects, the network 102 may include multiple networks, as well as being a network of networks, but is shown in more simple form so as to not obscure other aspects of the present disclosure.

It should be understood that any number of user devices, servers, and data sources may be employed within the operating environment 100 within the scope of the present disclosure. Each may comprise a single device or multiple devices cooperating in a distributed environment. For instance, the search engine 108 may be provided via multiple devices arranged in a distributed environment that collectively provide the functionality described herein. Additionally, other components not shown may also be included within the distributed environment.

The computing device 104 can be a client device on the client-side of the operating environment 100, while the search engine 108 can be on the server-side of operating environment 100. For example, the search engine 108 can comprise server-side software designed to work in conjunction with client-side software on the computing device 104 so as to implement any combination of the features and functionalities discussed in the present disclosure. This division of the operating environment 100 is provided to illustrate one example of a suitable environment, and there is no requirement for each implementation that any combination of the search engine 108 and the computing device 104 remain as separate entities. While the operating environment 100 illustrates a configuration in a networked environment with a separate computing device, search engine, keyword index, image embedding database, and item database, it should be understood that other configurations can be employed in which components are combined. For instance, in some configurations, a computing device may also serve as a data source and/or may provide search capabilities.

The computing device 104 may comprise any type of computing device capable of use by a user. For example, in one aspect, the computing device 104 may be the type of computing device 1000 described in relation to FIG. 10 herein. By way of example and not limitation, a computing device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where search queries may be performed via the client interface component 106 or where notifications can be presented via the client interface component 106. A user may be associated with the computing device 104. The user may communicate with the search engine 108 through one or more computing devices, such as the computing device 104.

At a high level, the search engine 108 receives a text-based search query (e.g., a natural language query or structured query) or an audio query comprising voice or other audio input from the computing device 104 (or another computing device not depicted). In aspects, the text-based query or the audio query comprises one or more keywords. The search query may comprise any type of input from a user for initiating a search comprising one or more keywords. In response to receiving the search query, the search engine 108 generates, aggregates, and ranks image-based results and text-based results in a single set of search results.

In some configurations, the search engine 108 may be embodied on one or more servers. In other configurations, the search engine 108 may be implemented at least partially or entirely on a user device, such as computing device 1000 described in FIG. 10. The search engine 108 (and its components) may be embodied as a set of compiled computer instructions or functions, program modules, computer software services, or an arrangement of processes carried out on one or more computer systems.

As shown in FIG. 1, the search engine 108 includes the query module 110, the generation module 112, the search module 114, and the fusion module 116. In one aspect, the functions performed by modules of the search engine 108 are associated with one or more personal assistant applications, services, or routines. In particular, such applications, services, or routines may operate on one or more user devices (such as computing device 104) or servers (e.g., the search engine 108), or may be distributed across one or more user devices and servers. In some aspects, the applications, services, or routines may be implemented in the cloud. Moreover, in some aspects, these modules of the search engine 108 may be distributed across a network, including one or more servers and client devices (such as computing device 104), in the cloud, or may reside on a user device such as computing device 104.

In addition, the modules of the search engine 108 and the functions and services performed by these modules may be implemented at appropriate abstraction layer(s) such as an operating system layer, an application layer, or a hardware layer, etc. Alternatively, or in addition, the functionality of these modules (or the aspects of the technology described herein) can be performed, at least in part, by one or more hardware logic components. For instance, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Further, although functionality is described herein with regards to specific modules shown in search engine 108, it is contemplated that in some aspects, functionality of one of the modules can be shared or distributed across other modules.

The query module 110 receives a search query comprising one or more text-based keywords. For example, a user may input a search query at computing device 104 via a client interface component 106 that provides access to a search engine. As previously mentioned, the search query may comprise any type of input from a user for initiating a search comprising one or more keywords.

The query module 110 may be configured to receive the search. Additionally, the user interface module 116 may be configured to communicate the search query, a sample image, search results for the search query, or item listings associated with the search query, to other modules of search engine 108, such as the fusion module 116 for example. Further, the user query module 110 may be configured to transmit a sample image, the search results for the search query, or item listings associated with the search query, to computing devices, such as computing device 104.

Continuing the example, the query module 110 may cause one or more graphical user interface displays of various computing devices to display the search query, a sample image, or item listings associated with the search query. In aspects, query module 110 causes the client interface component 106, through which the search query is input (e.g., by a user in a search tool on a web page), to display the search query, a sample image, or item listings associated with the search query. Further, the query module 110 may comprise an Application Program Interface (API) that allows applications to submit the search query (and optionally other information, such as user information, contextual information, and the like) for receipt by the search engine 108.

The generation module 112 utilizes a machine learning model to generate an image based on the one or more text-based keywords. The generation module 112 comprises any type of machine learning model that takes text as input and generates an image from the text (i.e., image generator). The image generator can be based on any number of different architectures. For instance, the image generator could be based on a generative adversarial network (GAN), a diffusion model, or a variational autoencoder. Examples of existing image generators include the DALL-E 2, Imagen, Midjourney, and Stable Diffusion image generators.

Although described as a single machine learning model, the generation module 112 may be a series of machine learning models working together to generate the image. The machine learning model translates the text information corresponding to the one or more text-based keywords into a numeric representation. For example, the machine learning model outputs a list of numbers representing each word of the one or more text-based keywords (i.e., a vector for each word). In some aspects, a second machine learning model selects a first portion of the one or more text-based keywords and a list of numbers is output representing only the first portion.

The second machine learning model may be trained to identify words that have visual characteristics. Accordingly, the second machine learning model selects the first portion of the one or more text-based keywords based on identifying words of the one or more text-based keywords that have visual characteristics. Additionally or alternatively, the second machine learning model may be trained to select the first portion of the one or more text-based keywords based on knowledge learned from user feedback.

The generation module 112 leverages a random starting image information array and gradually processes or diffuses the vectors output by the machine learning model. Each step of this process modifies the random starting image information array until a processed image information array that resembles the one or more text-based keywords and visual information the machine learning model learned from training images is produced. The generation model 112 decodes the processed image information array into a sample image.

The search module 114 identifies search results in response to search queries processed against item database 134, which is described in more detail below. For example, the search module 114 may query the keyword index 130 to identify results that satisfy criteria of the text-based search query. In some aspects, the results identified in the keyword index 130 are mapped to items in the item database 134. The search module 114 may also convert the sample image into a vector and query the image embedding database 132 to identify vectors of images that are similar to the vector of the sample image. In some aspects, vectors of images in the image embedding database 132 are mapped to items in the item database 134. For clarity, an item may be an item listing for a product and may include a variety of additional information, such as price, price range, quality, condition, ranking, material, brand, manufacturer, etc.

The fusion module 116 aggregates the items that are identified by the text-based search query and the image query into a single set of search results. The fusion module 116 also ranks the aggregated search results. In some aspects, information learned from historical search sessions or user feedback is utilized to optimize the ranking of the aggregated search results. For example, selections made by other users submitting similar queries may be leveraged to increase or decrease the ranking of individual items within the aggregated search results.

In some aspects, feedback may be stored in search logs. The search logs may be embodied on a plurality of databases, wherein one or more of the databases comprise one or more hardware components that are part of the search engine 108. In aspects, the search log are configured for storing information regarding historical search sessions for users, including, for instance, search queries submitted by a plurality of users via client interface components (e.g., client interface component 106), search results associated with the historical search queries, item listings for the search results, or user interactions (e.g., hovers, click-throughs, purchases, etc.) associated with the search results. In some embodiments, the search logs store a timestamp (e.g., day, hour, minute, second, etc.) for each user query submitted in various modalities, search result, item listing associated with the search result, user interaction with the search result, and so forth.

In addition, the information stored in search logs regarding historical search sessions may include other result selection information, such as subsequent filters selected in response to receiving search results and item listings. In some embodiments, result selection information may include the time between two successive selections of search results, the language employed by the user, and the country where the user is likely located (e.g., based on a server used to access the search engine 108). In some implementations, other information associated with the historical search sessions that is stored may comprise user interactions with a ranking displayed within an item listing, negative feedback displayed with the item listing, and other information such as whether the user clicked or viewed a document associated with an item listing. User information including user cookies, cookie age, IP (Internet Protocol) address, user agent of the browser, and so forth, may also be stored in search logs. In some embodiments, the user information is recorded in the search logs for an entire user session or multiple user sessions.

The keyword index 130, image embedding database 132, and item database 134 may comprise data sources or data systems, which are configured to make data available to any of the various constituents of operating environment 100. The keyword index 130, image embedding database 132, and item database 134 may be discrete components separate from search engine 108 or may be incorporated or integrated into the search engine 108 or other components the operating environment 100. Among other things, item database 134 can store search results associated with search queries in various modalities about which information can be indexed in keyword index 130 and image embedding database 132.

The keyword index 130 and image embedding database 132 can take the form of an inverted index, but other forms are possible. The keyword index 130 and image embedding database 132 stores the information about items in a manner that allows the search engine 108 to efficiently identify search results for a search query. The search engine 108 can be configured to run any number of queries on the keyword index 130 and image embedding database 132.

The keyword index 130, according to an example embodiment, may include an inverted index storing a mapping from textual search queries to items in item database 134. The image embedding database 132, according to an example embodiment, may include an inverted index storing a mapping from vectors corresponding to images to items in item database 134.

Figure 2:
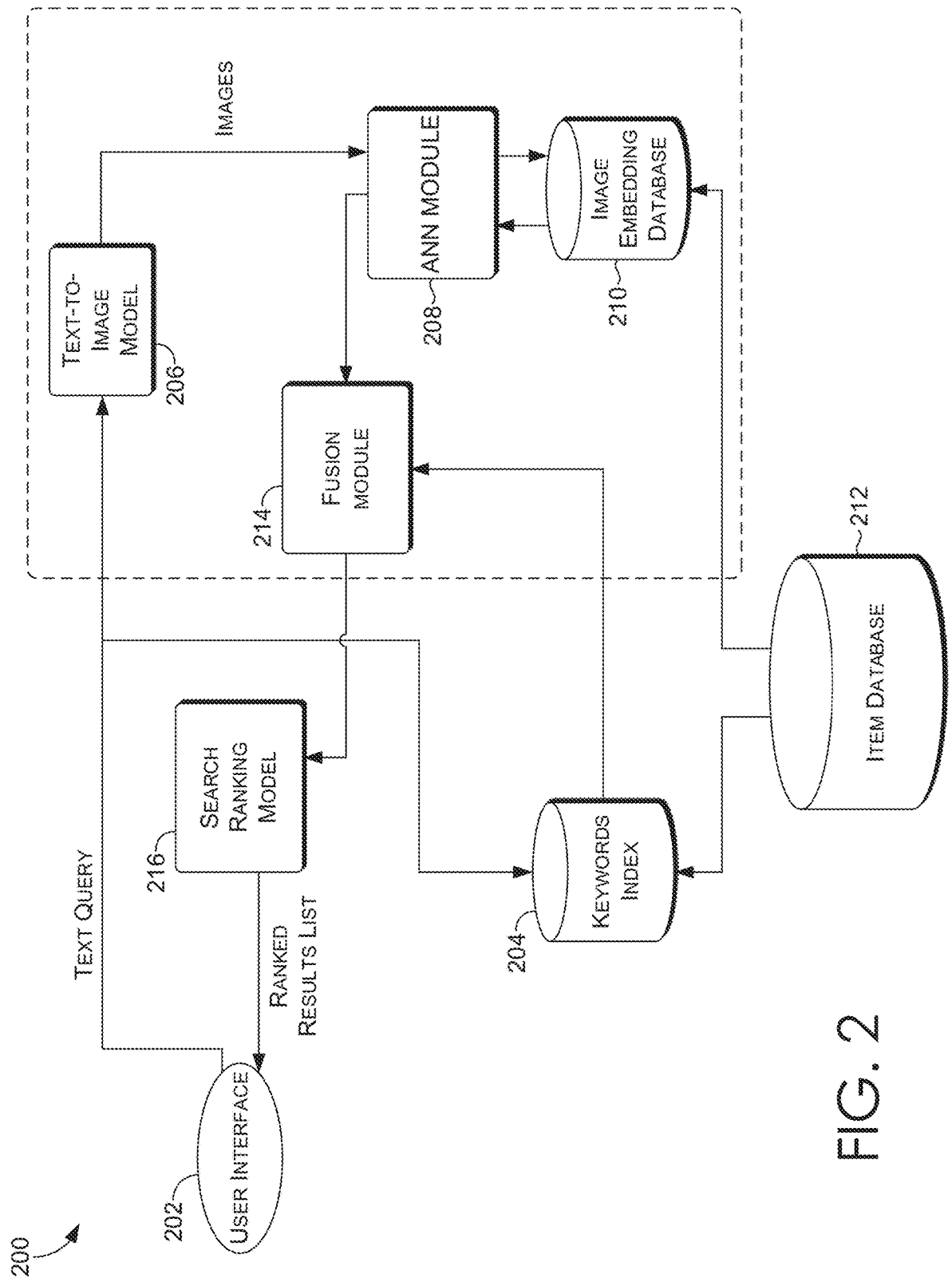
FIG. 2 is a network diagram of an example showing text-based search optimization via implicit image search augmentation system, according to an aspect of the technology described herein.

In practice, and turning now to FIG. 2, network diagram 200 showing text-based search optimization via implicit image search augmentation system, according to an aspect of the technology described herein, is provided. Initially, a user submits a text-based query comprising one or more text-based keywords to a search engine via user interface 202. The one or more text-based keywords are compared to keywords in the keywords index 204. Based on this comparison, similar keywords that are mapped to items in the item database 212 are identified. Using the mappings, items can be retrieved from the item database 212 and fused with items identified by the image search, described below, by fusion module 214.

While the text-based search is being performed, the text-based query comprising the one or more text-based keywords is communicated to the text-to-image model 206. At least a portion of the one or more-text based keywords is converted to an image by the text-to-image model 206. A search is performed by an approximate nearest neighbor (ANN) module 208 to identify similar images. To do so the image is initially converted into a vector by an image embedding model (not shown) such as Residual Network (ResNet), Vision Transformer (ViT), or Vision Transform Masked Autoencoders (ViTMAE). Images corresponding to items in item database are also converted into vectors by the image embedding model and stored at image embedding database 210. The vectors are mapped to items in item database 212. By comparing the vectors to the vector of the image (i.e., a similarity search), similar images can be identified and retrieved by ANN module 208.

As mentioned above, fusion module 214 fuses or aggregates the items retrieved by ANN module 208 with items retrieved in the keyword search. A search ranking model 216 ranks the fused or aggregated items. The ranked results list is provided to the user via the user interface 202.

Figure 3:
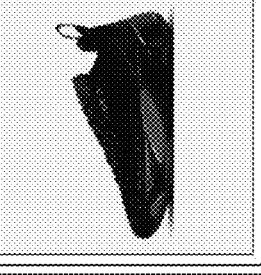
FIG. 3 is an example user interface showing text-based search results, according to an aspect of the technology described herein.

In FIG. 3, an example user interface 300 showing text-based search results, according to an aspect of the technology described herein, is provided. As illustrated, a user has input the keywords "red," "nike," and "sneaker" into the search engine. The search results are limited to items that include the terms "red," "nike," and "sneaker" in their description. However, as illustrated, the search results also include items that are probably not responsive to the intent of the user. For example, item 304 includes a black NIKE sneaker that includes a red accent merely because the seller entered the accent color in the item description. However, the actual intent of the user searching for "red nike sneaker" is likely to identify sneakers with a primary color of red.

Figure 5:
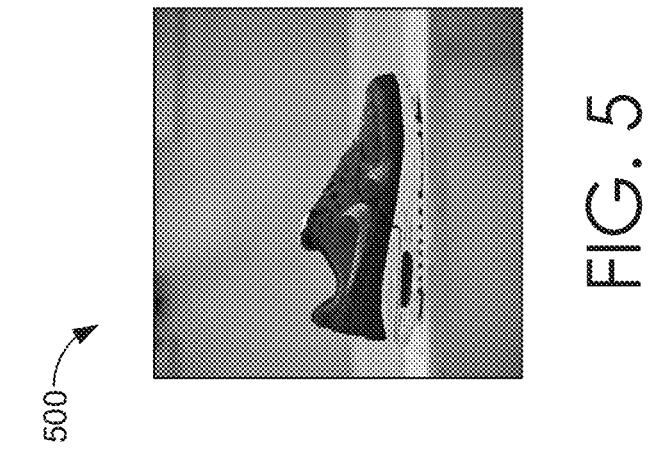
FIG. 5 is an example seed image generated from text-prompt, according to an aspect of the technology described herein.
Figure 4:
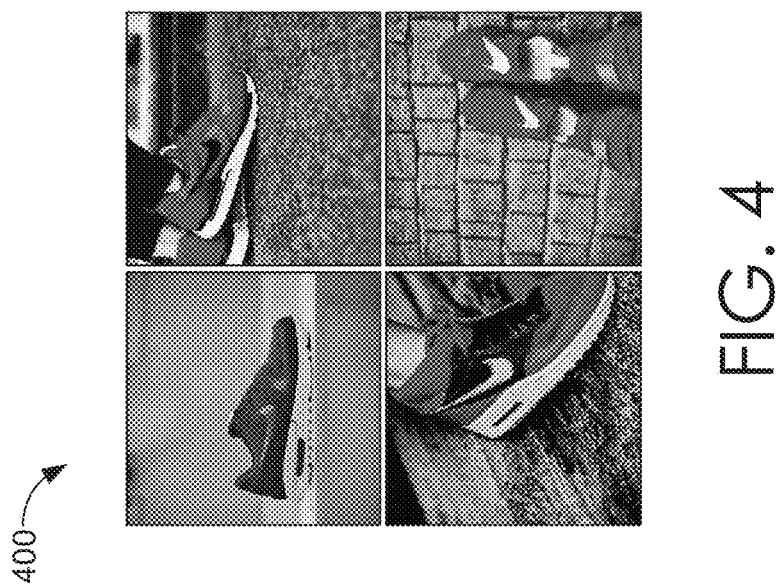
FIG. 4 illustrates image search results via text-prompt generated images, according to an aspect of the technology described herein.

Next, FIG. 4 illustrates image search results 400 via text-prompt generated images, according to an aspect of the technology described herein. In this example, assume the user input the same keywords "red," "nike," and sneaker into the search engine. A machine learning model converts these keywords into images such as the image search results 400. The machine learning model may select one of the image search results 400 to be utilized as a seed image, such as seed image 500 shown in FIG. 5. In some aspects, a user interface enables the user to select a seed image form the image search results 400.

Figure 6:
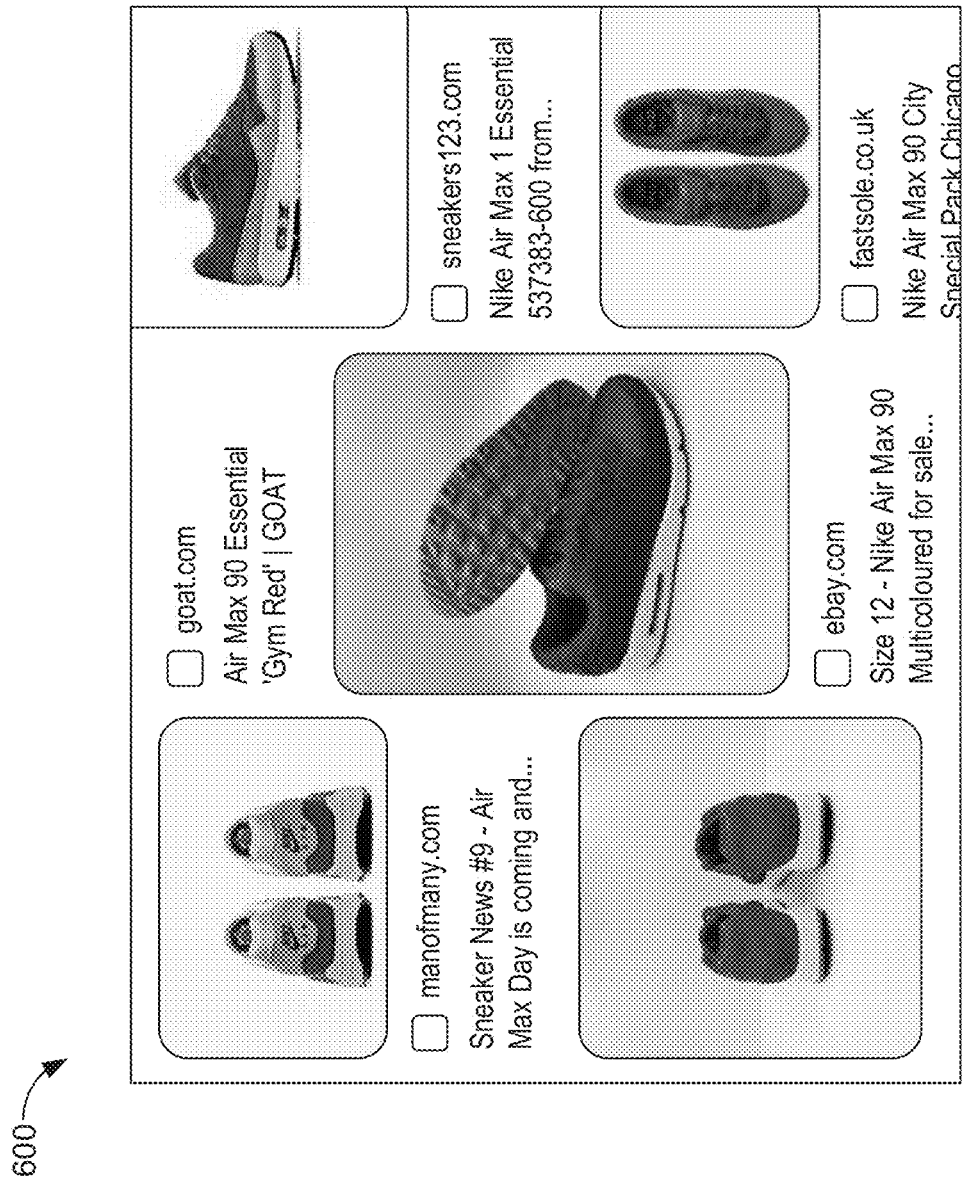
FIG. 6 illustrates similar images found via image search, according to an aspect of the technology described herein.

Turning now to FIG. 6, an example user interface 600 showing similar images found via image search, according to an aspect of the technology described herein, is provided. Continuing the example above, assume the machine learning model or the user selected seed image 500 shown in FIG. 5. The seed image is converted into a vector and compared to vectors of images corresponding to items in an item database. Based on the comparison, similar images are identified and provided in user interface 600.

Figure 7:
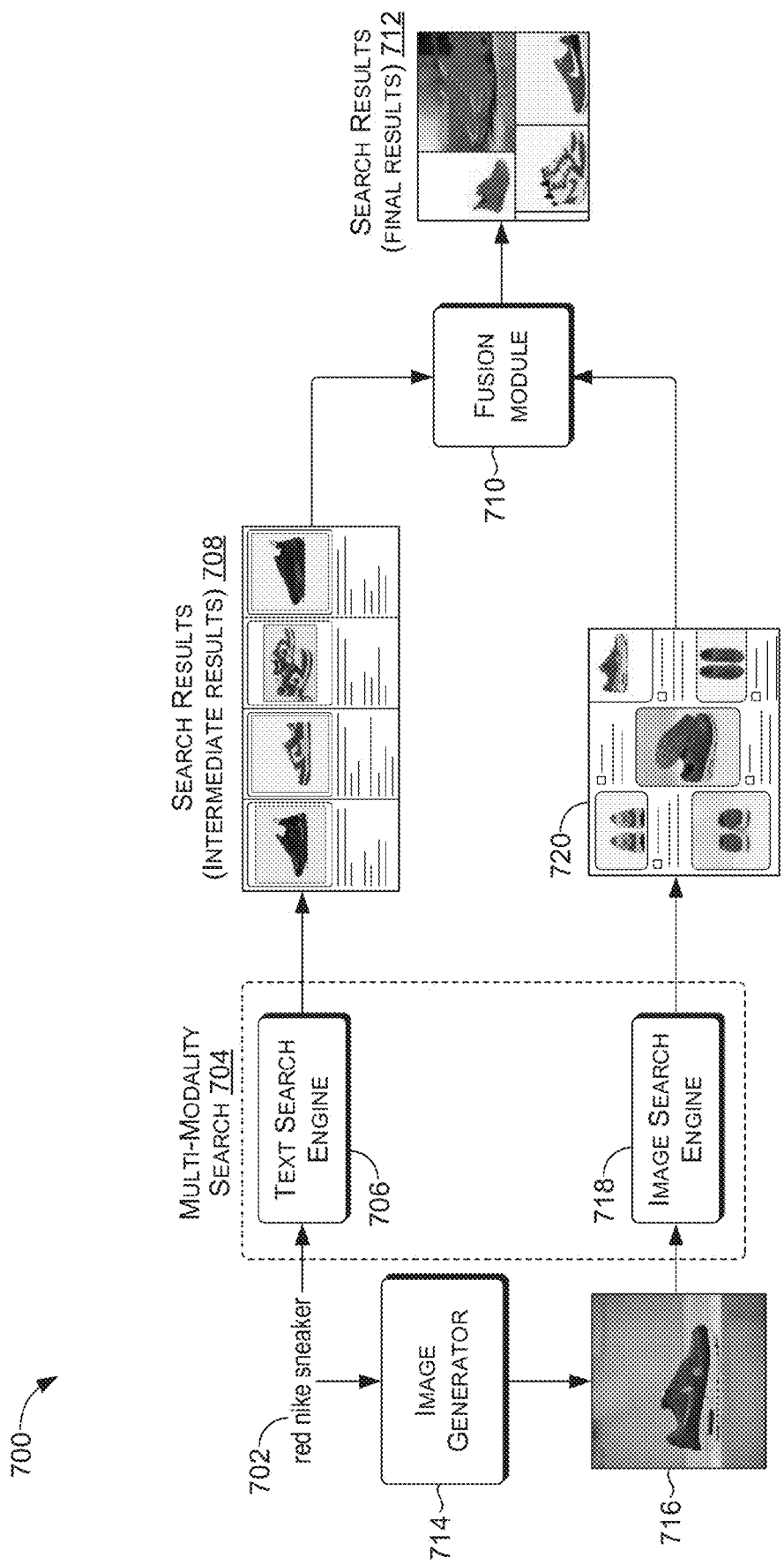
FIG. 7 is a network diagram of an example showing text-based search optimization via implicit image search results, according to an aspect of the technology described herein.

In practice, referring now to FIG. 7, a network diagram 700 of an example 700 showing text-based search optimization via implicit image search results, according to an aspect of the technology described herein, is provided. Initially, a user submits a text-based query comprising one or more text-based keywords 702 to a search engine via user interface. For example the one or more text-based keywords 702 may be "red nike sneaker." A multi-modality search 704 is performed that comprises a text-based search performed by text-search engine 706 and an image based search performed by image search engine 718.

The one or more text-based keywords 702 are compared by text-search engine 706 to keywords in a keywords index. Based on this comparison, similar keywords that are mapped to items in the item database are identified. Using the mappings, items can be retrieved from the item database and represent intermediate text-based search results 708.

While the text-based search is being performed, the one or more text-based keywords 702 are communicated to image generator 714. At least a portion of the one or more-text based keywords is converted to an image 716 by the image generator 714. A search is performed by image search engine 718 to identify similar images. To do so the image is initially converted into a vector. Images corresponding to items in item database have also previously been converted stored at image embedding database. The vectors are mapped to items in item database. By comparing the vectors to the vector of the image (i.e., a similarity search), similar images 720 can be identified. Using the mappings, items can be retrieved from the item database and represent intermediate image-based search results 720.

Finally, the intermediate text-based search results 708 and the intermediate image-based search results 720 are aggregated or fused by fusion module 710. The aggregated results are ranked and provided to the user as the final search results 712.

Figure 8:
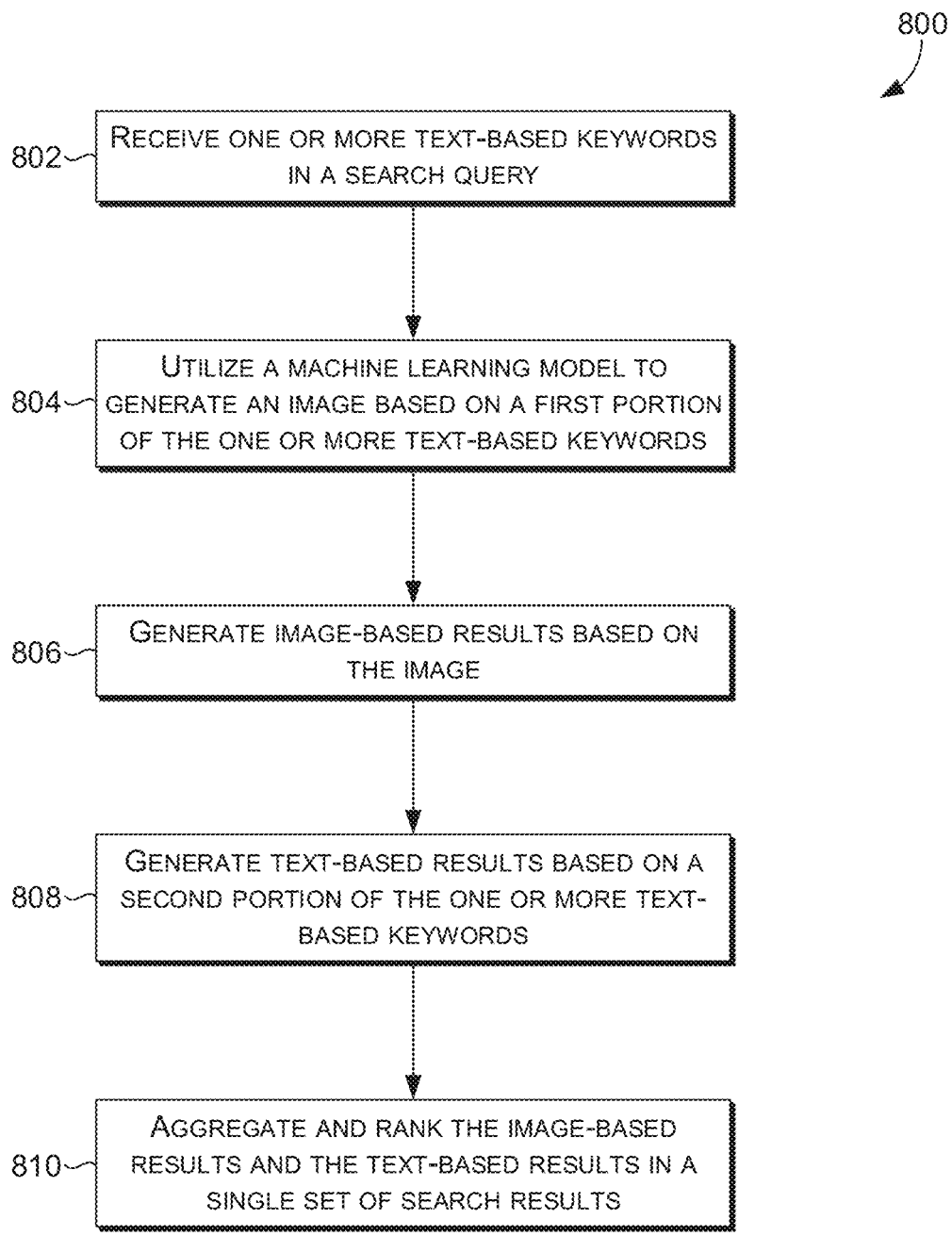
FIG. 8 is a flow diagram showing a method for providing text-based search optimization via implicit image search augmentation for a portion of a search query, in accordance with an aspect of the technology described herein.

FIG. 8 is a flow diagram showing a method 800 for providing text-based search optimization via implicit image search augmentation for a portion of a search query, in accordance with an aspect of the technology described herein. The method 800 may be performed, for instance, by the search engine 108 of FIG. 1. As shown at block 802, one or more text-based keywords is received at a search engine in a search query. In aspects, the search query may be received from computing device 104 via client interface component 106 of FIG. 1.

At block 804, a machine learning model is utilized to generate an image based on a first portion of the one or more text-based keywords. In some aspects, the machine learning model is a Stable Diffusion model. The first portion of the one or more text-based keywords of the one or more text-based keywords may be selected utilizing a second machine learning model. Additionally or alternatively, the first portion of the one or more text-based keywords is determined to have visual characteristics. In some aspects, selecting the first portion of the one or more text-based keywords is optimized based on feedback.

At block 806, image-based results are generated based on the image. To do so, representations (i.e., a vector) of items are generated in an image embedding database utilizing images corresponding to the items stored in an item database. A representation (i.e., a vector) of the generated image is also generated utilizing a neural network. Based on a comparison of the representation of the image to the representations of the items, similar images can be identified in the image embedding database. The similar images are mapped to items in the item database. Accordingly, items corresponding to the similar images are provided as image-based results.

At block 808, text-based results are generated based on a second portion of the one or more text-based keywords. The second portion of the one or more text-based keywords of the one or more text-based keywords may be selected utilizing the second machine learning model. Additionally or alternatively, the second portion of the one or more text-based keywords may include each of the one or more text-based keywords. Selecting the second portion of the one or more text-based keywords may be optimized based on feedback. The second portion of the one or more text-based keywords is utilized to identify text-based results corresponding to items in an item database.

At block 810, the image-based results and the text-based results are aggregated and ranked in a single set of search results. In some aspects, the generated image is used concurrently with the second portion of the one or more text-based keywords to generate results. Feedback may be utilized to optimize ranking of image-based and text-based results.

Figure 9:
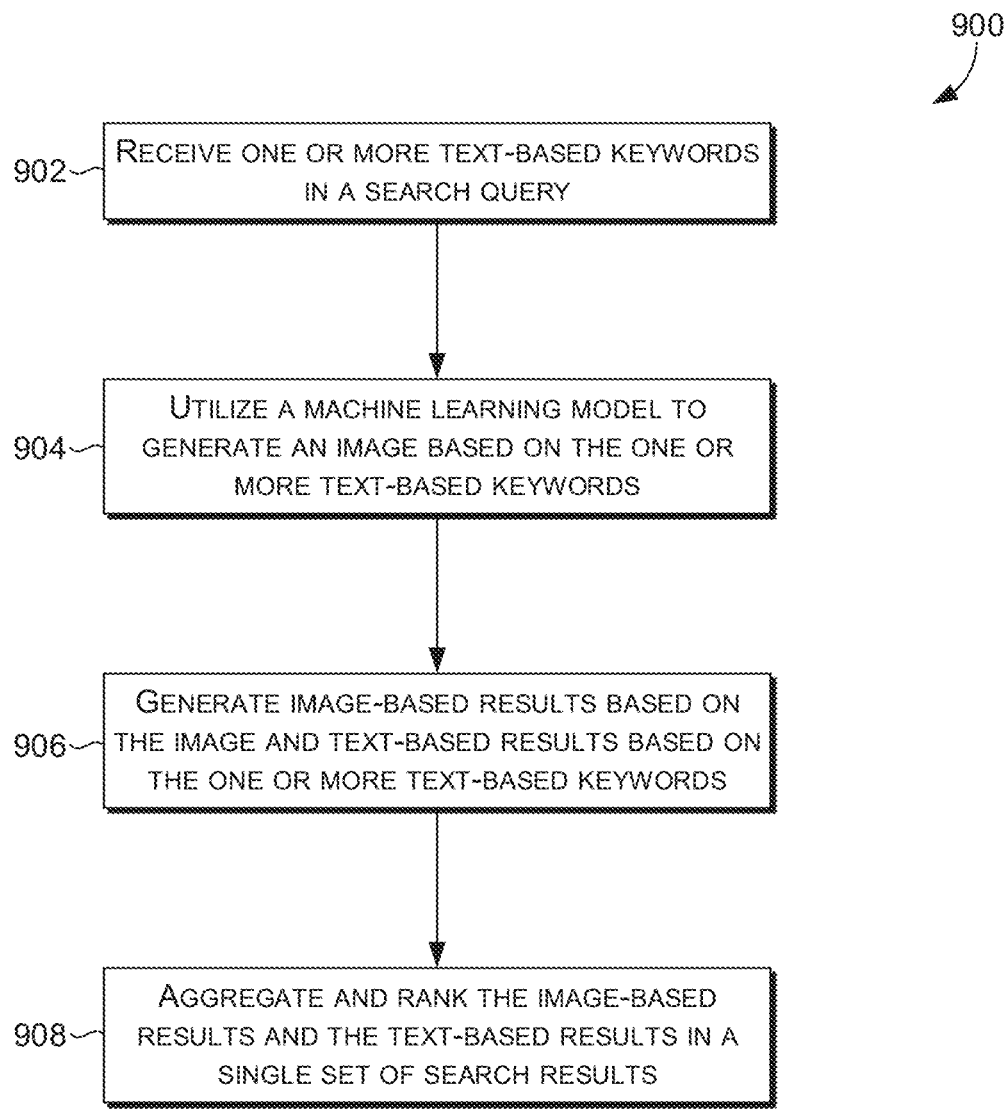
FIG. 9 is a flow diagram showing a method for providing text-based search optimization via implicit image search augmentation, in accordance with an aspect of the technology described herein.

FIG. 9 is a flow diagram showing a method 900 for providing text-based search optimization via implicit image search augmentation, in accordance with an aspect of the technology described herein. The method 900 may be performed, for instance, by the search engine 108 of FIG. 1. As shown at block 902, one or more text-based keywords is received at a search engine in a search query. In aspects, the search query may be received from computing device 104 via client interface component 106 of FIG. 1.

At block 904, a machine learning model is utilized to generate an image based on the one or more text-based keywords. In some aspects, the machine learning model is a Stable Diffusion model. The machine learning model may be comprised of a series of machine learning models working together to generate the image.

At block 906, image-based results are generated based on the image text-based results are generated based on the one or more text-based keywords. To generate the image-based results, representations (i.e., a vector) of items are generated in an image embedding database utilizing images corresponding to the items stored in an item database. A representation (i.e., a vector) of the generated image is also generated utilizing a neural network. Based on a comparison of the representation of the image to the representations of the items, similar images can be identified in the image embedding database. The similar images are mapped to items in the item database. Accordingly, items corresponding to the similar images are provided as image-based results.

To generate the text-based results, the one or more text-based keywords are compared to keywords in a keyword index. The keywords in the keyword index are mapped to items stored in the item database. Based on the comparison of the one or more text-based keywords to keywords corresponding to items in the item database, responsive items are identified as the text-based results.

At block 908, the image-based results and the text-based results are aggregated and ranked in a single set of search results. In some aspects, the generated image is used concurrently with the second portion of the one or more text-based keywords to generate results.

Figure 10:
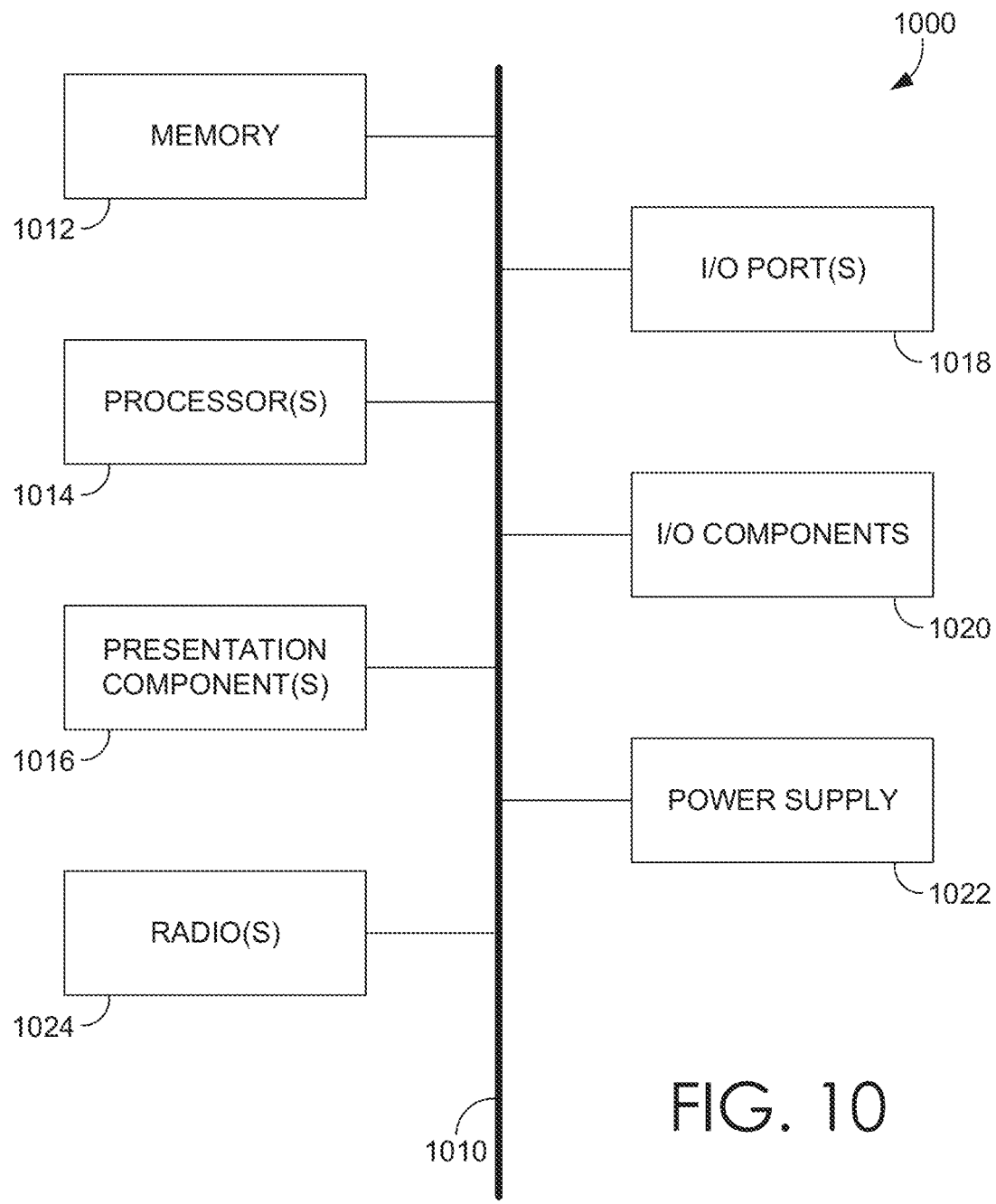
FIG. 10 is an example computing device suitable for implementing the described technology, in accordance with an aspect described herein.

With reference to FIG. 10, computing device 1000 includes a bus 1010 that directly or indirectly couples the following devices: memory 1012, one or more processors 1014, one or more presentation components 1016, one or more input/output (I/O) ports 1018, one or more I/O components 1020, and an illustrative power supply 1022. Bus 1010 represents what may be one or more busses (such as an address bus, data bus, or combination thereof). Although the various blocks of FIG. 10 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 10 is merely illustrative of an exemplary computing device that can be used in connection with one or more aspects of the present technology. Distinction is not made between such categories as "workstation," "server," "laptop," "handheld device," etc., as all are contemplated within the scope of FIG. 10 and with reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors 1014 that read data from various entities such as memory 1012 or I/O components 1020. Presentation component(s) 1016 presents data indications to a user or other device. Exemplary presentation components include a display device, speaker, printing component, vibrating component, and the like.

The I/O ports 1018 allow computing device 1000 to be logically coupled to other devices, including I/O components 1020, some of which may be built in. Illustrative components include a microphone, joystick, game pad, satellite dish, scanner, printer, wireless device, etc.

The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

Some aspects of computing device 1000 may include one or more radio(s) 1024 (or similar wireless communication components). The radio 1024 transmits and receives radio or wireless communications. The computing device 1000 may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

What is claimed is:

1. A computer implemented method for search optimization using implicit search augmentation, the method comprising:
    receiving, at a search server, a plurality of text-based keywords in a search query communicated over a network from a client device to the search server;
    identifying, by a first machine learning model, a first portion of the plurality of text-based keywords as having visual characteristics;
    responsive to identifying the first portion of the plurality of text-based keywords as having visual characteristics, generating, by a second machine learning model, a generated image based on the first portion of the plurality of text-based keywords, wherein a random starting image information array is modified until a processed image information array resembles the first portion of the plurality of text-based keywords and visual information learned by the second machine learning model, and further wherein the processed image information array is decoded into the generated image;
    generating, by an image embedding model, a vector of the generated image;
    identifying, at an image search engine, a first set of items from an item database using the vector of the generated image to query an image embedding database storing a plurality of image vectors generated for images of a plurality of items in the item database;
    identifying, at a text search engine, a second set of items from the item database using a second portion of the plurality of text-based keywords to query a keywords index;
    aggregating, by a fusion module, the first set of items and the second set of items to provide an aggregated set of items;
    generating a single set of search results by ranking items in the aggregated set of items; and
    communicating, from the search server over the network to the client device, the single set of search results as a response to the search query for presentation on the client device.

2. The method of claim 1, wherein the second machine learning model is a diffusion model.

3. The method of claim 2, further comprising:
    utilizing the images of the plurality of items in the item database, generating, by the image embedding model, the plurality of image vectors; and
    storing the plurality of image vectors in theimage embedding database.

4. The method of claim 1, wherein the first set of items are identified based on a comparison of the vector of the generated image to at least a portion of the plurality of image vectors in the image embedding database.

5. The method of claim 1, wherein the first set of items are provided as image-based results.

6. The method of claim 1, wherein the generated image is used to identify the first set of items concurrently with using the second portion of the plurality of text-based keywords to identify the second set of items.

7. The method of claim 1, further comprising utilizing feedback to optimize ranking of the items in the aggregated set of items.

8. The method of claim 1, wherein identifying the first portion of the one or more text-based keywords is optimized based on the feedback.

9. One or more non-transitory computer storage media storing computer-readable instructions that when executed by a processor, cause the processor to perform operations, the operations comprising:
    receiving, at a search server, a plurality of text-based keywords in a search query communicated over a network from a client device to the search server;
    identifying, by a first machine learning model, a first portion of the plurality of text-based keywords as having visual characteristics;
    responsive to identifying the first portion of the plurality of text-based keywords as having visual characteristics, generating, by a second machine learning model, a generated image based on the first portion of the plurality of text-based keywords, wherein a random starting image information array is modified until a processed image information array resembles the plurality of text-based keywords and visual information learned by the second machine learning model, and further wherein the processed image information array is decoded into the generated image;

generating, by an image embedding model, a vector of the generated image;

identifying, at an image search engine, a first set of items from an item database using the vector of the generated image to query an image embedding database storing a plurality of image vectors generated for images of a plurality of items in the item database;

identifying, at a text search engine, a second set of items from the item database using a second portion of the plurality of text-based keywords to query a keywords index; and aggregating, by a fusion module, the first set of items and the second set of items to provide an aggregated set of items;

generating a single set of search results by ranking items in the aggregated set of items; and communicating, from the search server over the network to the client device, the single set of search results as a response to the search query for presentation on the client device.

10. The one or more non-transitory computer storage media of claim 9, wherein the second machine learning model is a diffusion model.

11. The one or more non-transitory computer storage media of claim 9, further comprising:

utilizing the images of the plurality of items in the item database, generating, by the image embedding model, the plurality of image vectors; and storing the plurality of image vectors in the image embedding database;

wherein the first set of items are identified based on a comparison of the vector of the generated image to at least a portion of the image vectors in the image embedding database.

12. The one or more non-transitory computer storage media of claim 9, wherein the generated image is used to identify the first set of items concurrently with using the the second portion of the plurality of text-based keywords to identify the second set of items.

13. A system for search optimization using implicit search augmentation, the system comprising:

at least one processor; and one or more computer storage media storing computer-readable instructions that when executed by the at least one processor, cause the at least one processor to perform operations comprising:

receiving, at a search server, a plurality of text-based keywords in a search query communicated over a network from a client device to the search server;

identifying, by a first machine learning model, a first portion of the plurality of text-based keywords as having visual characteristics;

responsive to identifying the first portion of the plurality of text-based keywords as having visual characteristics, generating, by a second machine learning model, a generated image based on the first portion of the plurality of text-based keywords, wherein a random starting image information array is modified until a processed image information array resembles the first portion of the plurality of text-based keywords and visual information learned by the second machine learning model, and further wherein the processed image information array is decoded into the generated image;

generating, by an image embedding model, a vector of the generated image;

identifying, at an image search engine, a first set of items from an item database using the vector of the generated image to query an image embedding database storing a plurality of image vectors generated for images of a plurality of items in the item database;

identifying, at a text search engine, a second set of items from the item database using a second portion of the plurality of text-based keywords to query a keywords index; and aggregating, by a fusion module, the first set of items and the second set of items to provide an aggregated set of items;

generating a single set of search results by ranking items in the aggregated set of items; and communicating, from the search server over the network to the client device, the single set of search results as a response to the search query for presentation on the client device.

14. The system of claim 13, wherein the second machine learning model is a diffusion model.

* * * * *